United States Patent [19]

Smart

[11] 4,230,046
[45] Oct. 28, 1980

[54] CONVERTIBLE RAILWAY VELOCIPEDE

[76] Inventor: Richard C. Smart, 3502 Buckskin Rd., Coeur d'Alene, Id. 83814

[21] Appl. No.: 38,486

[22] Filed: May 14, 1979

[51] Int. Cl.³ .................. B61D 15/10; B61F 9/00; B61F 13/00; B62H 1/12
[52] U.S. Cl. ........................... 105/95; 105/92; 280/293
[58] Field of Search .................. 105/91, 92, 95; 280/239, 293; 333/5

[56] References Cited

U.S. PATENT DOCUMENTS

| | | | |
|---|---|---|---|
| 225,585 | 3/1880 | Fox | 105/92 |
| 249,895 | 11/1881 | Campbell et al. | 105/92 |
| 550,520 | 11/1895 | Mellor | 105/91 |
| 693,128 | 2/1902 | Gorneman | 105/95 |
| 753,106 | 2/1904 | Pierce | 105/91 |
| 758,106 | 4/1904 | Richmond | 333/5 X |
| 862,936 | 8/1907 | Philips | 280/293 |
| 1,077,210 | 10/1913 | Alesani | 280/293 |
| 1,254,434 | 1/1918 | Rea | 105/95 |
| 1,436,532 | 11/1922 | Revny | 105/95 |
| 1,511,147 | 10/1924 | Towers | 280/293 |
| 3,653,679 | 4/1972 | Howard | 280/239 X |

*Primary Examiner*—Howard Beltran

[57] ABSTRACT

A bicycle having forwardly and rearwardly extendible guide wheels and a pivotably mounted lateral outrigger wheel to allow use of the vehicle as a bicycle on a solid roadway or a velocipede on railroad tracks. The forward and rearward guide wheels adjust laterally to accommodate a wide range of rail sizes and the outrigger wheel adjusts laterally to accommodate normal rail spacings. With the appurtenant wheels folded to an inoperative position, the vehicle may be effectively operated as a normal bicycle.

4 Claims, 20 Drawing Figures

CONVERTIBLE RAILWAY VELOCIPEDE

BACKGROUND OF INVENTION

1. RELATED APPLICATIONS

There are no patent applications related hereto heretofore filed in this or any foreign country.

2. FIELD OF INVENTION

This invention relates generally to an occupant propelled bicycle-type vehicle and more particularly to such a vehicle having movably mounted appurtenant wheel structures to adapt it for use on railroad tracks.

3. DESCRIPTION OF PRIOR ART

In the present day with the change of economics and general cultural conditions many railroad lines have ceased to be used and others have become used very little. Oftentimes these rail lines that have come into disuse service areas that have high recreational potential and oftentimes such areas are not served by other means of vehicular access. It has become desirable, especially in these instances, to provide some sort of a simple, inexpensive vehicle for travel upon the rails of railroad trackage. The instant invention seeks to provide an operator propelled bicycle-type vehicle that may be used as a bicycle and converted with auxiliary structures for use as a velocipede on railroad tracks. Although the primary purpose of my invention is to create a vehicle for recreational use, it may also serve in light commercial applications for transportation of personnel in the railroad industry itself.

Operator propelled velocipedes of various sorts have long been known, probably since the inception of rail travel. Most of these vehicles, however, have been designed specifically for use in rail travel and because of this have generally used some sort of a metallic, flanged wheel which is common in railroad vehicles, to maintain the vehicle on the rails. Such velocipedes have generally been for commercial use and have by reason of this been relatively heavy and of expensive type of construction. Some such velocipedes have been manually powered but in general they have provided some type of mechanical power.

The instant invention is distinguished from this prior art by providing a typical pneumatic tired bicycle with auxiliary forward and rearward guide wheels to maintain the vehicle on one railroad rail and an outrigger wheel to run on the other rail to aid in maintaining vehicular balance. The appurtenant wheel structures are foldably mounted so that the vehicle may be operated either as an ordinary bicycle or a velocipede on railroad trackage. The vehicle is designed particularly for recreational use and is not appreciably heavier or more expensive than ordinary bicycles of present day commerce. These features may also enhance its light commercial use as in such use it is readily transportable to a use site and may be commonly available for use. Because of the lighter construction of the vehicle and its pneumatic tire support it may be readily propelled by its operator over rails whereas many prior art devices were so massive and difficult of propulsion that they could not be readily used as a recreational type vehicle, especially if manually propelled. My invention is also light enough that it may be readily, manually, removed from trackage to allow passage of ordinary railway vehicles whereas many prior art devices could not be removed without aid or some auxiliary side track structure. My vehicle also provides appropriate adjustments by simple manipulation to accommodate to all commerical rail sizes and spacings common to American railroads. The appurtenant structures of my vehicle, when folded so that it may be used as a bicycle, are so positioned that substantially the normal bicycle balance is maintained for easy operation and operator comfort. An auxiliary switching structure is provided that automatically operates to turn the vehicle onto lefthand switches and the vehicle's light weight and mobility readily permit vehicular manipulation to move it onto righthand switches.

my invention resides not in either the bicycle or velocipede per se but rather in the combination of them in a single vehicle and in the several combinations of structures hereinafter specified that allow the aforesaid functions.

SUMMARY OF INVENTION

My invention in general provides a heavy duty bicycle with foldably mounted auxiliary structure including front and rear guide wheels and an outrigger wheel that adapt it for use on rails of railroad trackage.

A forward guide wheel frame, mounted on a forward bicycle wheel axle, pivots forwardly from an upward inactive position to operatively position a front guide wheel truck on a supportive rail immediately forwardly of the forward bicycle wheel. This front truck mounts two sets of paired, rearwardly biased, guide wheels over a rail to maintain the front bicycle wheel thereon. Travel wheels support the truck on the upper surface of a rail traversed.

Rearward guide wheel truck is carried for rearward pivotal motion by a yoke mounted on the rearward bicycle wheel axle. This rearward guide wheel truck, again, provides paired inwardly biased guide wheels positionable on both sides of a rail to maintain the rear bicycle wheel thereon with an intermediate travel wheel supporting the truck for motion on the rail. The rear guide wheel yoke is biased to a downward operative position but manually movable to an upward inoperative fashion.

The outrigger wheel, carried at a spaced distance laterally of the rear bicycle wheel, is journaled on an axle carried by the rear outrigger wheel support. This rear outrigger wheel support is pivotably mounted on the rear wheel fork of the bicycle frame for vertical pivotable motion. A forward angled outrigger wheel support extends, from pivotable mounting by a ball and socket joint carried by the handle bar mount, laterally rearwardly to the outer portion of the rear outrigger wheel support to provide additional stability. Both outrigger wheel supports are adjustable in length to allow lateral positioning of the outrigger wheel upon the rail opposite that supporting the bicycle to accommodate various rail spacings. The rearward outrigger wheel support is maintainable in a vertical position and forward angled support in a rearwardly extending horizontal position, both adjacent the bicycle frame, when not in use.

When the appurtenant structures used for rail travel are in operative position, the two bicycle wheels are positioned on the left rail of the set of rails to be traversed with the front and rear guide wheels extending on both sides of that rail and the outrigger wheel is supported on the righthand rail of that rail system as illustrated. When the appurtenances for rail travel are in relaxed or stored position they do not interfere with the normal operation of the vehicle as a bicycle for use on an ordinary flat roadway. The vehicle may be readily manually converted from one mode to the other.

In providing such a vehicle it is:

A principal object of my invention to provide a bicycle having movable mounted front and rear guide wheels and lateral outrigger wheel to convert the vehicle for use in traversing a traditional two rail railroad track.

A further object of my invention to provide such a vehicle that may be used as a normal bicycle when the guide wheels and outrigger wheel are in relaxed or inoperative condition.

A still further object of my invention to provide such a vehicle that has substantially the same balance as a normal bicycle when used for either railroad or roadway travel.

A still further object of my invention to provide such a vehicle that is created by adding appurtenant structures to an ordinary bicycle of commerce.

A still further object of my invention to provide such a vehicle that has appropriate adjustments to accommodate its use with any normal rail sizes or rail spacings common to American railroading.

A still further object of my invention to provide such a vehicle that is of new and novel design, of rugged and durable nature, of simple and economic manufacture and one that is otherwise well suited to the uses and purposes for which it is intended.

Other and further objects of my invention will appear from the following specification and accompanying drawings which form a part hereof. In carrying out the objects of my invention, however, it is to be understood that its accidental features are susceptible of change in design and structural arrangement with only one preferred and practical embodiment being illustrated in the accompanying drawings as is required.

BRIEF DESCRIPTION OF DRAWINGS

In the accompanying drawings which form a part of this specification and wherein like numbers of reference refer to similar parts throughout.

DESCRIPTION OF PREFERRED EMBODIMENT

My invention provides generally bicycle 16 supporting front guide wheel structure 17, rear guide wheel structure 18 and outrigger wheel structure 19, all movable from operative to inoperative positions to provide a duel purpose, operator propelled velocipede that may be operated upon railroad track structure 23 or as an ordinary bicycle on a normal roadway.

Bicycle 16 is of the common variety of commerce providing frame 24, supporting in its forward portion handle bar 26 and depending front wheel fork 25 which in turn supports journal 27 carrying front wheel 28. The medial portion of the frame in its uppermost part supports seat structure 29 and in its lower part journals pedal crank 30. The rearward portion of the frame supports rear wheel journal 31 carrying rear wheel 32 propelled by drive structure 33 communicating between the pedal crank and the rear wheel. Drive structure 33 commonly embodies a roller-link chain which is protected by chain cover 34 structurally supported on the bicycle frame. This structure is common, in its essence at least, to the bicycles of present day commerce and it is this type of vehicle which forms the basic body of my invention. I prefer to use the so-called "heavy duty" type of bicycle because of their greater strength and rigidity which provide greater durability, but more importantly, commonly provide larger tires with a wider bearing surface to better support and propel the vehicle when used for rail travel.

Such a bicycle may or may not be provided with a gear type drive as desired. It most commonly, however, will be provided with some sort of a brake handle 35 associated with one handle of handle bar 36 to activate the braking system when depressed toward the handle bar.

My invention proper comprises the combination of auxiliary structures carried by the bicycle to adapt it for travel on the rails of a railroad.

Figures 3, 4:
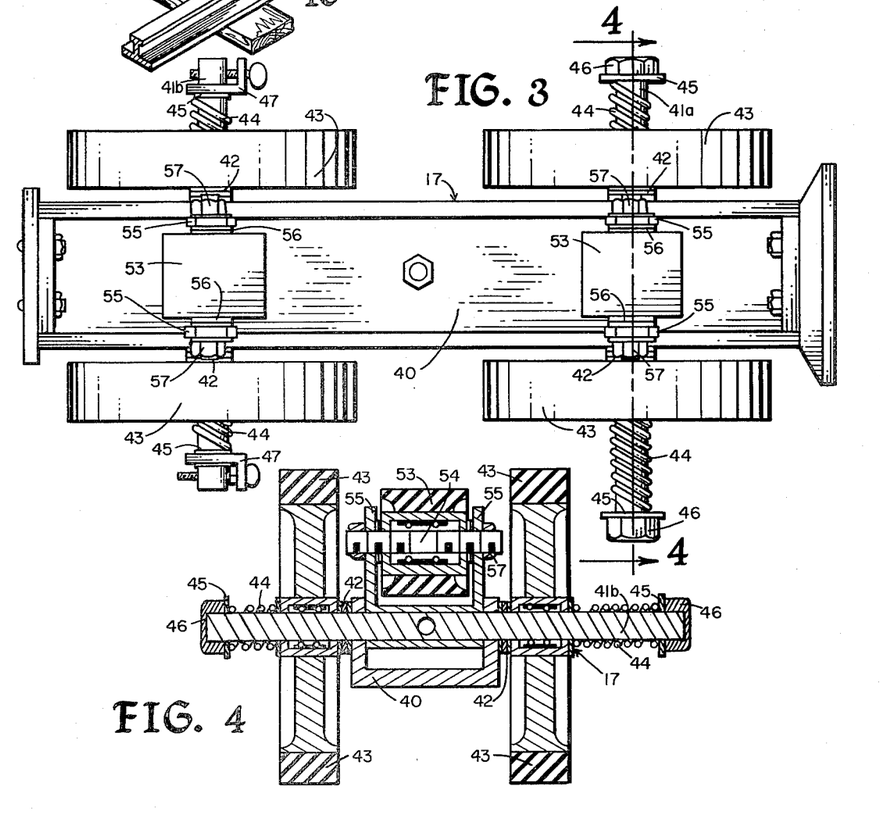
FIG. 3 is an isometric, top view of the forward guide wheel truck.
FIG. 4 is an orthographic, cross-sectional view of the truck of FIG. 3 taken on a vertical plane through the line 4—4 of FIG. 3, viewed in the direction indicated by the arrows on that line.

Front guide wheel truck 17 is shown in detail particularly in FIGS. 3 and 4 where it is seen to comprise open-bottom, box-like body 40 peripherally defined by planar metal elements mechanically interconnected, preferably by welding. This body supports two laterally extending, longitudinally spaced guide wheels axles 41 of a length somewhat greater than the width of the body. Each guide wheel axle carries a plurality of spacing washers 42 on each outer side of body 40 with similar paired, opposed guide wheels 43 journaled outwardly adjacent thereto. The guide wheels are biased to a position adjacent body 40 by compression springs 44 carried about axles 41 outwardly of the guide wheels and limited in their outward motion by washers 45 and locking collars 46 carried by the end parts of the axles.

Figures 5, 6, 7:
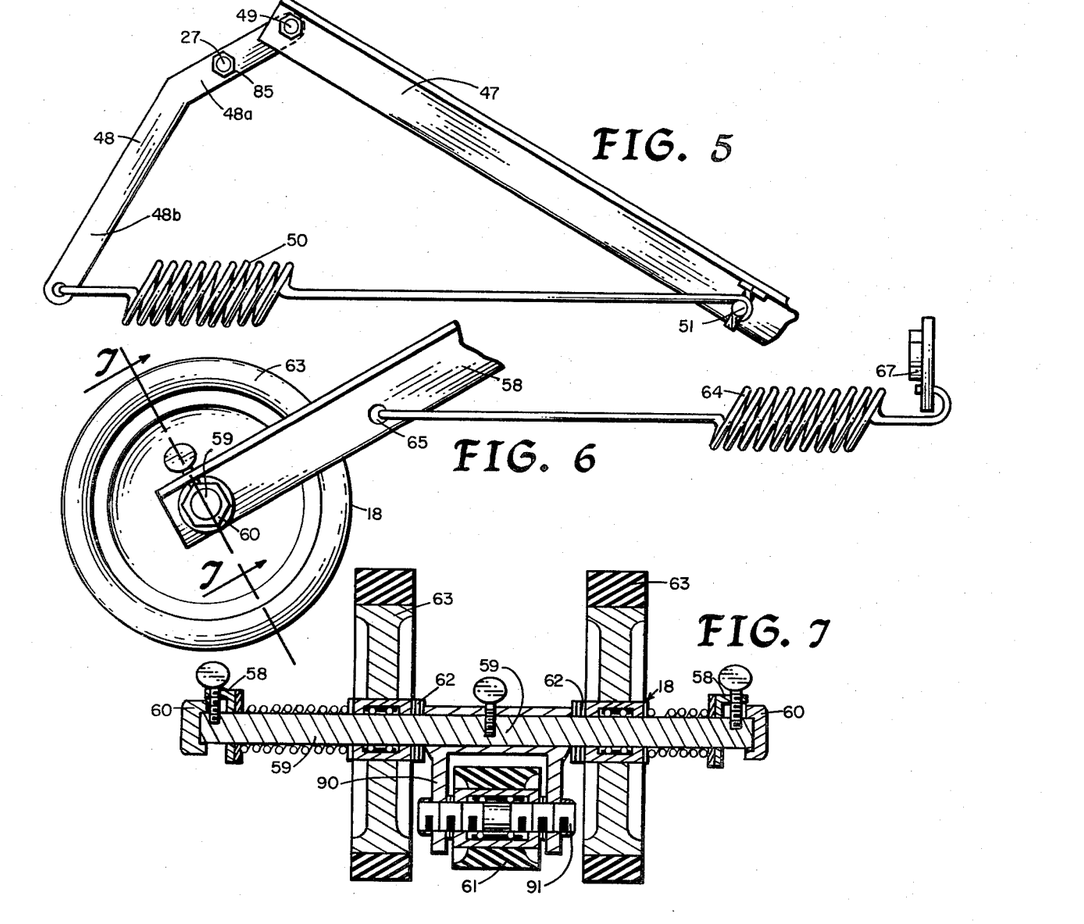
FIG. 5 is a partial, orthographic side view of the mounting yoke and biasing mechanism of the forward guide wheel structure.
FIG. 6 is a partial, orthographic side view of the mounting and biasing mechanism of the rear guide wheel structure.
FIG. 7 is an orthographic, transverse, cross-sectional view through the rear guide wheel structure taken on the line 7—7 of FIG. 6 in the direction indicated by the arrows thereon.

Rearwardmost guide wheel axle 41b supports in each of its outermost parts, similar, paired, elongate front guide wheel yokes 47. The mounting of these yokes on bicycle 16 is seen bestly in the partial view of FIG. 5. Each guide wheel yoke 47 is pivotably mounted, in the end part of shorter arm 48a of similar period, opposed bell cranks 48, by nut-bolt combinations 49 communicating therebetween. The medial portion of shorter arm 48a of the bell crank is irrotatably fastened to the normally threaded outer portion of front wheel journal 27 by nut 85 threadedly engaged on the journal. The outer end part of each longer bell crank arm 48b carries extension springs 50, each communicating in extension to spring pins 51 carried in the forward medial part of front guide wheel yoke 47, as illustrated, to bias each yoke to a downward position when the spring be placed as illustrated in FIG. 5, since bell crank 48 is irrotatably mounted relative to front wheel journal 47 of the bicycle. If springs 50 be released from spring pins 51, front guide wheel yokes 47 may be pivoted about bolts 49 to allow the front wheel truck to pivot upwardly and rearwardly to rest upon front fender 38 and front fender mount 39 of the bicycle where it is releasably maintained by clip 86 (FIG. 1) carried by the handle bar mount 37. After the front guide wheel truck be positioned in in this inoperative mode, extension springs 50 may be replaced against their bias upon their spring pins 51 and the springs, again, will tend to bias the wheel truck into its inoperative position.

As shown particularly in FIGS. 3 and 4 front guide wheel truck body 40 carries two similar, spaced travel wheels 53 journaled on traverse wheel axles 54 carried by paired opposed travel wheel brackets 55 depending below guide wheel axles 41. Preferably washers 56 are provided on each side of the travel wheels to aid rotation and the axles 54 are maintained in lateral alignment by nuts 57 threadedly engaged on their end parts.

The dimensioning of the front guide wheel structure is such, as illustrated, that when the travel wheels are supported on the upper surface of a rail to be traversed the guide wheels extend therebelow on each side of the rail to serve their purpose. The width of body 40 between cooperating guide wheels obviously must be greater than the width of the narrowest rail to the traversed. Spacing of the guide wheels to accommodate different width rails may be accomplished by varying the number of spacing washers 22 to provide the appropriate spacing between the paired opposed guide wheels 43. The spring biased mounting of the guide wheels automatically adjusts guide wheel spacing to the particular rail being traversed. I have found that there is quite a difference in rail thickness (transverse dimension) and the length of guide wheel axles should be sufficient to accommodate this.

The rear wheel structure is seen particularly in the illustrations of FIGS. 6 and 7. Similar, paired, opposed rear guide wheel yokes 58, here comprising angle iron elements, are pivotably mounted on each side of threaded outer ends of rear wheel journal 31 of bicycle 16 by nuts 92 to extend rearwardly therefrom past the periphery of rear bicycle wheel 32. The rearward end portion of yokes 58 cooperatively and irrotatably carry transverse rear guide wheel axle 59 which is maintained therebetween by paired, opposed locking collars 60. The medial portion of axle 59 pivotably carries depending travel wheel bracket 90 which in turn carries in its lower part rear travel wheel axle 91 which journals smaller travel wheel 61 to support the structure on a rail being traversed. Plural spacing washers 62 are carried on each side of bracket 90 to space therefrom opposed cooperating guide wheels 63 journaled laterally outwardly on axle 59. Similar compression springs 64 are provided about axle 59 outwardly of each guide wheel to bias each guide wheel inwardly toward the other. These compression springs are supported against lateral extension by the inner surface of rearward guide wheel yokes 58. As seen in FIG. 6 similar opposed extension springs 64 extend from extension spring holes 65 in each yoke forwardly to rear outrigger support bracket 67 to bias the rear guide wheel yokes to a downward position to maintain them in contact with the rail supporting the rear bicycle wheel.

Again, this rear guide wheel structure is sized and configured substantially as illustrated and similarly to the front guide wheel structure to allow the rear guide wheels to contact a rail supporting the bicycle immediately rearwardly adjacent the rear bicycle wheel with the travel wheel supported on the upper surface of a rail and the guide wheel extending therebelow on each side. With the forward portion of yoke 58 pivotably mounted on the rear bicycle wheel journaled, if biasing spring 64 be released or if the rear guide wheel structure be moved against the spring bias, it may be pivoted upwardly and forwardly to the inoperative position illustrated in FIG. 2, resting immediately below and rearwardly adjacent folded outrigger wheel 19 where it is maintained by forward outrigger whel support 78 during periods of nonuse.

Figures 8, 9, 10:
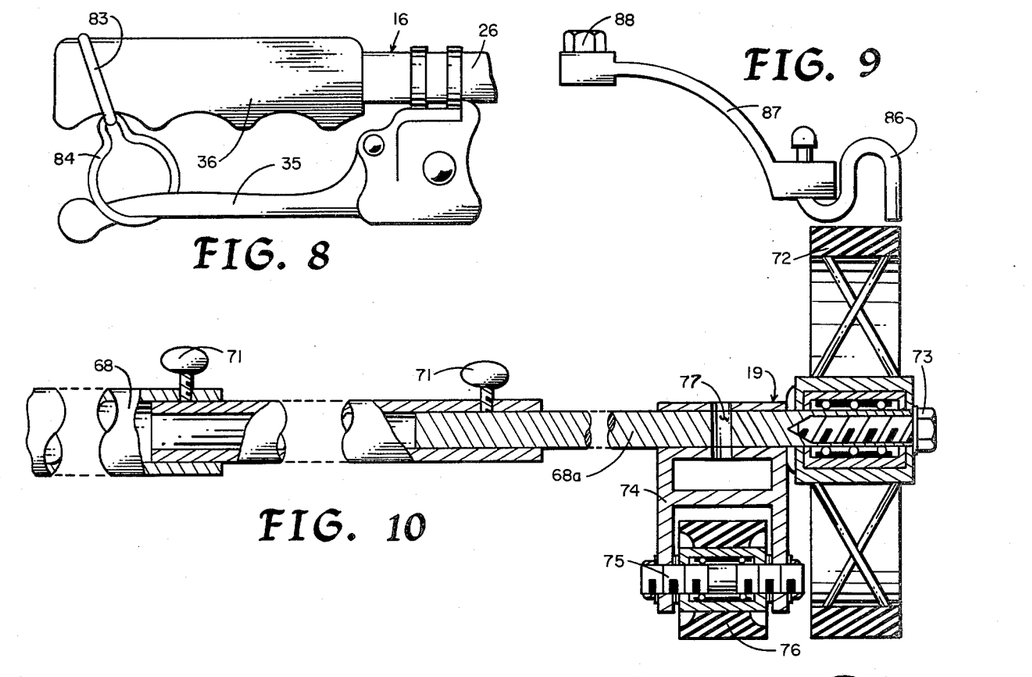
FIG. 8 is a partial, orthographic view of the handle bar handle and hand brake of my bicycle showing the means of maintaining the hand brake in operative braking position.
FIG. 9 is a partial, orthographic, side view of the support carried by the handle bar journal of the bicycle to support the forward guide wheel structure.
FIG. 10 is a vertical, cross-sectional view through the rear mounting arm and outrigger wheel taken on the line 10—10 of FIG. 1 in the direction indicated by the arrows thereon.
Figures 11, 12, 13, 14:
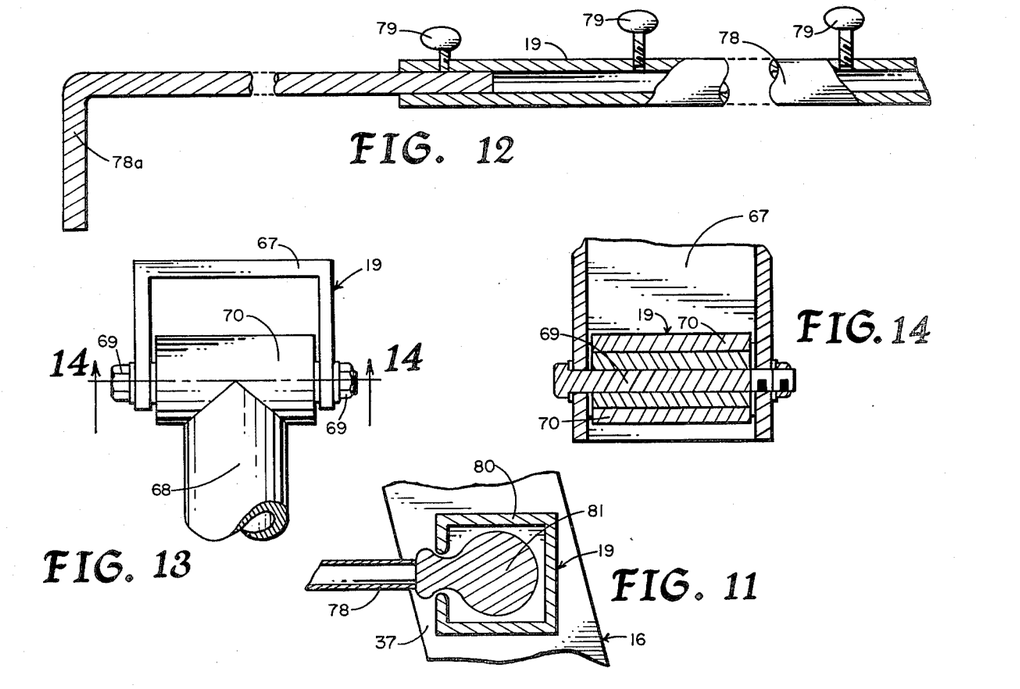
FIG. 11 is a partial, cross-sectional view through the ball and socket joint mounting the forward angled outrigger wheel support arm taken on the line 11—11 of FIG. 2 in the direction indicated by the arrows thereon.
FIG. 12 is a partial, cross-sectional view through the outer end part of the forward angled outrigger wheel support arm showing its structural details.
FIG. 13 is a partial, orthographic surface view looking downward on the bracket mounting the rear outrigger wheel support on the rear wheel fork of the bicycle frame.
FIG. 14 is a vertical, cross-sectional view through the mounting structure of FIG. 13 taken on the line 14—14 thereon in the direction indicated by the arrows.
Figure 15A:
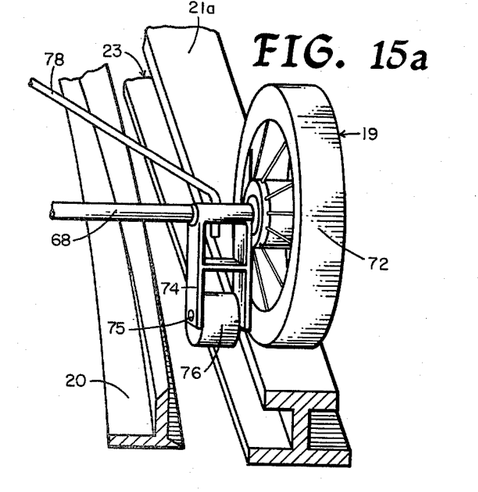
FIG. 15 comprises a series of partial, isometric illustrations showing progressively from FIG. 15a to 15f the entry and passage of the outrigger and switching wheel structure over a normal left hand railway switch structure.
Figure 15B:
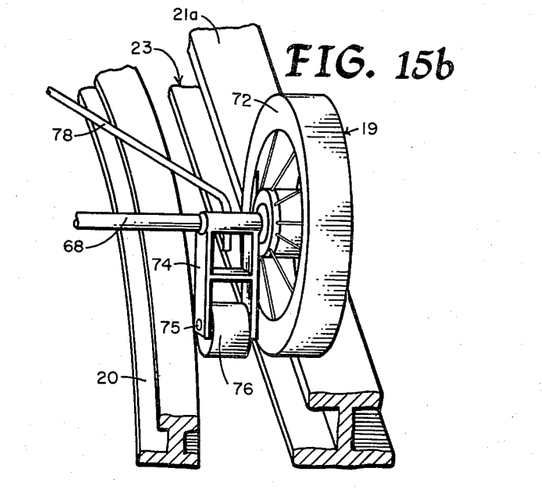
Figure 15C:
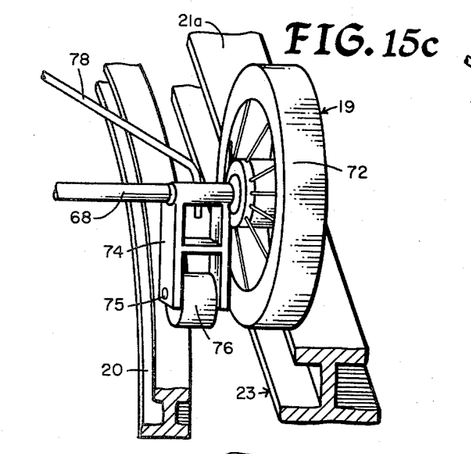
Figure 15D:
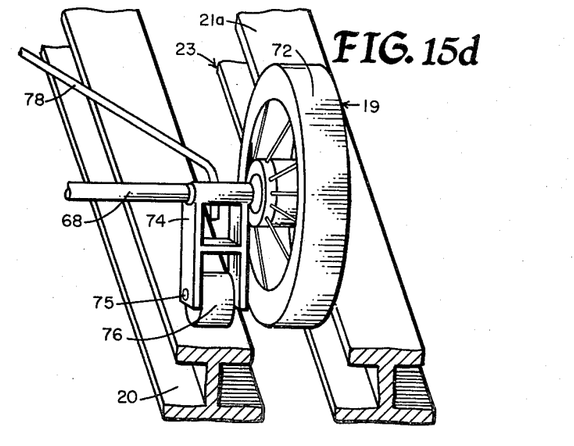
Figures 15E, 15F:
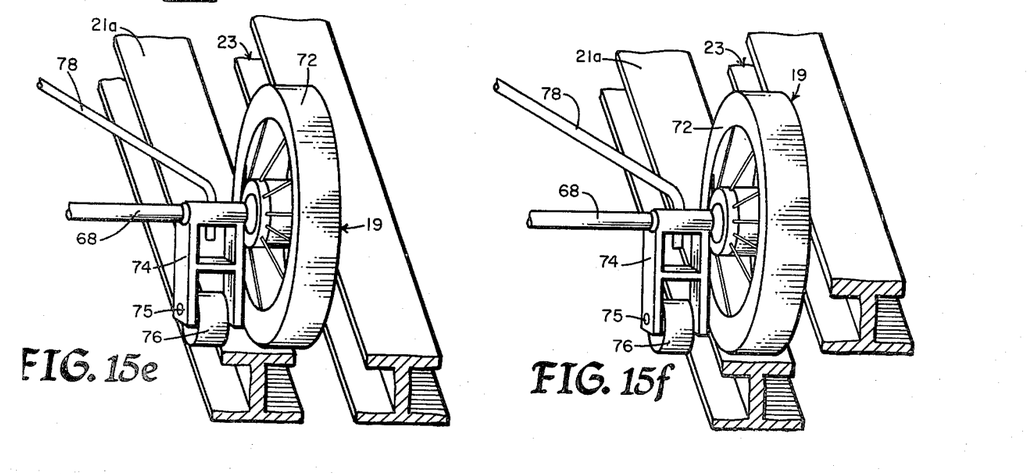

Outrigger wheel structure 19 is seen particularly in FIGS. 10 through 14. Fillet 66 (FIG. 1) structurally attached to the bicycle frame in its rearward part between frame elements and chain cover 34 rear outrigger wheel support bracket 67 structurally attached thereto to depend therefrom. This support bracket 67 is a "U" shaped channel element as illustrated in FIG. 13. The lower portion of the bracket pivotably mounts rear outrigger wheel support 68 by bolt-nut combination 69 extending between the bracket arm and through sleeve 70 carried between the bracket arms and mounting the inner end portion of the rear outrigger wheel support. The outrigger wheel support is a composite element having three telescopically related sections, each adjustably fastenable relative to the adjacent element by plural thumb screws 71 threadedly engaged in and extending through a larger element to frictionally communicate with the smaller element. The outermost wheel support element 68a is a solid rod as illustrated in FIG. 10 to journal in its end part outrigger whel 72 maintained thereon by wheel nut 73 threadedly engaged on the end part of wheel support element 68a. Immediately inwardly of outrigger wheel 72, wheel support element 68a carries switching wheel bracket 74 depending therefrom to carry in its lower part switching wheel axle 75 journaling smaller switching wheel 76 depending to the same level as the rear outrigger wheel. Forward outrigger wheel brace arm hole 77 is defined vertically through both switching wheel bracket 74 and rear support 68a to maintain the elements in irrotatable relationship in cooperation with the outrigger wheel brace. Angled brace 93 pivotably extends from support bracket 67 to releasably communicate with outrigger wheel support 68 to provide additional rigidity for the structure when in extended mode.

Figure 1:
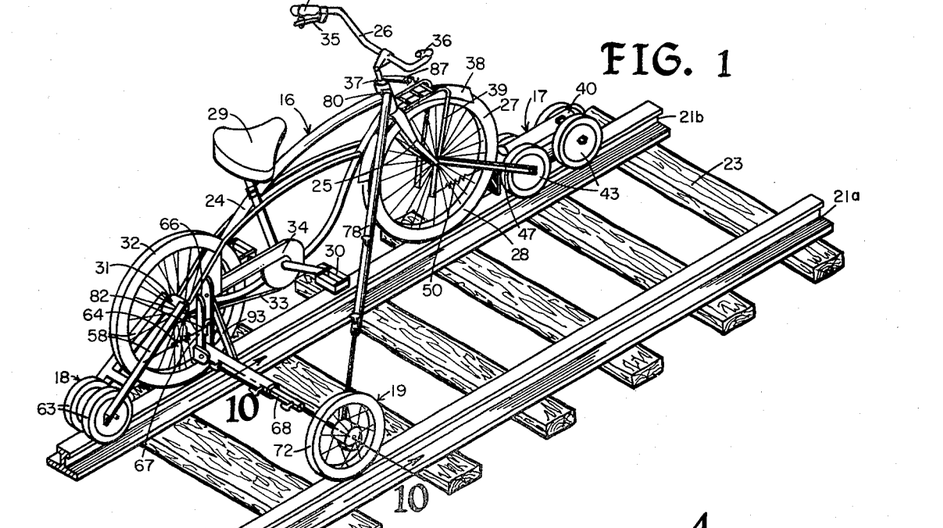
FIG. 1 is an isometric view of my vehicle in a mode for rail travel showing its various parts, their configuration and relationship.

Forward angled outrigger wheel brace 78 comprises a compound, elongate element having two parts telescopically related for length adjustment and fastenable relative each other by means of thumb screws 79 threadedly engaged in and extending through the larger part to frictionally engage the smaller. The forward portion of this brace is movably attached to handle bar mount 37 of the bicycle by a ball and socket joint, as illustrated in FIG. 11, having housing 80 structurally fastened to the handle bar mount and carrying ball 81 structurally communicating with the forward end portion of the outrigger wheel brace. The outermost portion 78a of the outer element of the brace is bent somewhat perpendicularly to the body of the brace and oriented to extend vertically downwardly so that it will fit within forward brace hole 77 to cooperate in providing a triangular support for the outrigger wheel axle. The outermost bent portion 78a of the forward outrigger wheel brace, when that brace be in stored or inoperative position contacts the relaxed rear guide wheel structure to aid in positionally maintaining both structures in the relaxed or inoperative mode. The adjustable length of both outrigger wheel support and brace and the movable mounting of the brace to the bicycle frame are required to allow adjustment of lateral position of the outrigger wheel relative to the bicycle to allow my vehicle to accommodate to various rail spacings. In its relaxed mode the rearward outrigger wheel brace is moved rearwardly to a horizontal position laterally adjacent the bicycle where it is supported by clip 86 carried by support arm 87 positioned on the seat bracket adjustment bolt 88, all as shown in FIG. 1.

The dimensioning of the outrigger wheel structure, again, is such as to allow it to be spaced at adjustable distances lateral of the bicycle 16 to accommodate the various rail spacings common in American railroading, generally from about thirty inches to sixty inches. With this structure and dimensioning the wheel may be positioned for railroad operation as illustrated in FIG. 1. The outrigger wheel structure similarly may be folded to the position illustrated in FIG. 2 by releasing forward outrigger brace 78 from the rear outrigger wheel support and folding that brace rearwardly to the position illustrated in FIG. 2 wherein it supports the rear guide wheel structure. The outrigger brace in turn is releasably supported by clip 87 carried on the bicycle seat support. The rear outrigger wheel support 68 may then be folded vertically upwardly about its pivot upon bolt 69 until it rests in the vertical position illustrated in FIG. 2, with the outrigger wheel immediately below and rearwardly of bicycle seat 29, in which position it is releasably maintained by spring clamp 82 carried by bracket 67.

As a matter of convenience it is desirable to provide some means of maintaining braking on the vehicle during periods of non-use, since if the vehicle be used in the rail operation mode its wheels commonly will be aligned parallel to the directions of travel and if the vehicle be not restrained it may move spontaneously on a grade. A simple and convenient method of accomplishing this with a bicycle hand operated braking mechanism is shown in the illustration of FIG. 8. Here I provide two interconnected rings, the first 83 being carried on the end part of the handle bar 36 spacedly adjacent associated brake handle 35 with interconnecting ring 84 of appropriate size positioned over the brake handle, as illustrated, to maintain that handle in operative condition to brake the vehicle. Obviously this structure is a convenience and not a necessity and other methods of braking the vehicle during non-use may equally well serve to the same purpose.

Figure 2:
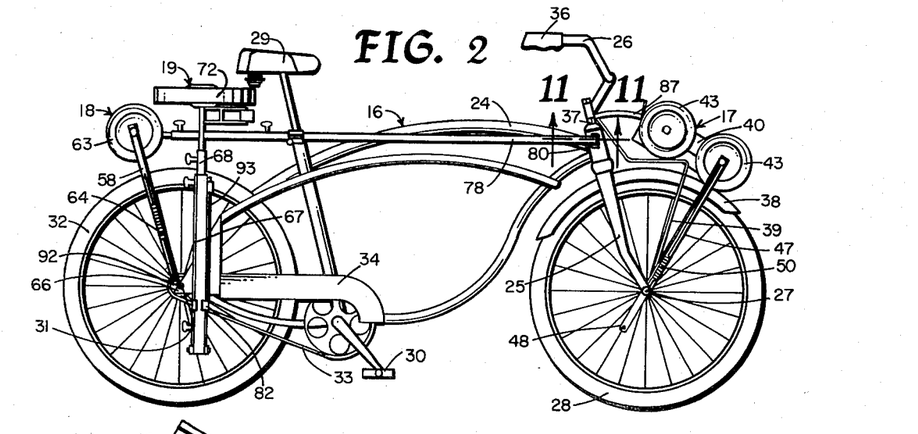
FIG. 2 is an orthographic, side view of the vehicle of FIG. 1 in a mode for roadway travel showing how its appurtenances fold and are maintained for this travel mode.

The operation of my vehicle can be readily understood from the foregoing description of its structure. A vehicle is formed as described. If it be desired to operate the vehicle as a normal bicycle the appurtenant structures for rail operation are all positioned as illustrated in FIG. 2 to provide a normal road mode of operation for the vehicle. In this mode it is to be particularly noted that the balance of the vehicle having my appurtenances is not appreciably different from that of a normal bicycle, and normal operation of the bicycle can be expected except for the weight factor.

If it be desired to operate my vehicle as a velocipede in its rail travel mode, the front and rear guide wheel structures are moved downwardly so that they are positioned as illustrated in FIG. 1 with their respective biasing springs in place to bias each to a downward position relative the bicycle and maintain the guide wheels in appropriate position on a supporting rail. Rear outrigger wheel support arm 68 is then pivoted vertically downwardly and laterally outwardly and its length adjusted to maintain the outrigger wheel on the rail 21a of a track system when the bicycle be supported on the left rail 21b. The forward outrigger wheel brace is then adjusted in length so that its end part will fit in brace hole 77 in rearward outrigger wheel support 68 and the end part is positioned in that hole. The width between guide wheels 43, 63 is adjusted by adding or removing spacing washers as required so that the guide wheels are substantially the same distance apart as the width of a rail to be traversed so that they will be biased against the sides of that rail. In this condition the vehicle is then placed on a rail system 23 with the bicycle structure on the left rail 21b and the outrigger on the right rail 21a, as illustrated in FIG. 1. The guide wheels then, since their trucks are biased to a downward position, will rest on both sides of the left rail being supported for motion thereon by the traveling wheels. In this condition the vehicle is ready for operation and may be moved upon the rail system by pedaling the vehicle as a normal bicycle. The rear bicycle wheel will turn upon pedaling manipulation and its friction upon the left rail will move the vehicle along the rail while it is maintained upon that rail by the guide wheels and maintained in balance by the outrigger wheel, because of the three point support of the vehicle on the rail system.

The operation of the vehicle in negotiating a left hand switch is illustrated particularly in the six diagrams comprising FIG. 15. In FIG. 15a outrigger wheel 72 is in normal operating position on the right rail with switching wheel 76 on the inside edge of supporting rail 21a. In this illustration we see also switching frog 20 adapted to move normal railroad vehicles into a left hand switch. In FIG. 15b the outrigger wheel has moved forwardly somewhat toward the left hand switching frog as the guide wheels on the left rail have moved the bicycle in that direction and because of the rigid connection of the outrigger wheel it must necessarily follow. In FIG. 15c the vehicle has moved slightly further forwardly and to the left and the switching wheel has engaged the upper surface of the left hand switching frog 20 and now supports the rearward outrigger wheel support upon that frog. In FIG. 15d the vehicle has moved further into the switch and at this point the outrigger structure is supported entirely on the switching frog 20 by switching wheel 76. The motion to the left continues by reason of bicycle position on the rail system and in FIG. 15e the switching wheel is moving off switch rail 20 and the outrigger wheel is moving toward support on the switching rail. In FIG. 15f the switching wheel is again in its normal travel position on the inside of the right rail and the outrigger wheel is supported thereon as the left hand switch is completed.

A right hand switch has been found to be more difficult to make automatically than a left hand switch. Generally the vehicle may be stopped and appropriately manipulated to accomplish the right hand switch as no auxiliary structures have been provided to accommodate this function automatically.

It should be particularly noted that through the structures described show an outrigger wheel structure extending on the right hand side of a bicycle with the vehicle operating on the left rail of a railroad track, this could readily be reversed with the vehicle operating on the right rail of the system and the outrigger wheel extending laterally to the left to be supported on the left rail of that system. The form of vehicle illustrated and described has, however, been found generally more convenient.

It should be further noted that the structures of my invention are auxiliary structures added to an ordinary bicycle, and though a particular bicycle is illustrated many of such vehicles of present day commerce of similar nature may serve the purposes of my invention.

The foregoing description of my invention is necessarily of a detailed nature so that a specific embodiment of it may be set forth as is required but it is to be understood that various modifications of detail, rearrangement and multiplication of parts might be resorted to without departing from its spirit, essence or scope.

Having thusly described my invention, what I desire to protect by Letters Patent, and

What I claim is:

1. A bicycle, having a medial frame rotatably mounting a rear wheel on a rear wheel axle and pivotably carrying a front wheel fork that rotatably mounts a front wheel on a front wheel axle, with movably mounted appurtenant structures to adapt for travel on railroad trackage having two spaced rails, comprising, in combination:

a forward guide wheel structure having a foward guide wheel truck rotatably supporting at least two adjustably spaced larger guide wheels and one smaller travel wheel therebetween said wheels so positioned that when the travel wheel is supported on an upper surface of a rail to be traversed the guide wheels extend therebelow on each side of said rail, said guide wheel truck being mounted on a yoke pivotably supported by the front wheel axle of a bicycle and extending forwardly therefrom to carry the forward guide wheel truck immediately radially outwardly of the periphery of the front wheel of the bicycle, said yoke being biased to a downward operative position but movable pivotally upwardly to an inoperative position, and said spaced guide wheels being biased toward each other and being journaled with plural washers therebetween to allow adjustment of the minumum space therebetween by regulation of said washers;

a rear guide wheel structure having a rear guide wheel yoke pivotably supporting at least two adjustably spaced larger guide wheels and one smaller travel wheel therebetween, said wheels so positioned that when the travel wheel is supported on the upper surface of a rail to be traversed the guide wheel extend below the upper surface thereof, sid rear guide wheel yoke being pivotably carried by the rear bicycle wheel axle to support the rear guide wheel structure immediately radially outwardly at the periphery of the rear wheel of the bicycle, and being biased to a downward position but pivotably movable and releasably maintainable in an inoperative upward position, and said spaced guide wheels being biased toward each other and being journaled with plural washers therebetween to allow adjustment of the minimum space therebetween by regulation of said washers;

an outrigger wheel structure carried by a rearward outrigger wheel support pivotably mounted upon the bicycle frame adjacent the rear wheel axle, said rear outrigger wheel support being movable from a vertical inoperative position to a horizontal operative position and journaled an outrigger wheel in its outer part to be supported on the rail opposed to that supporting the associated bicycle with a forward outrigger wheel support brace movably mounted on an upper forward position of the bicycle frame extendable from inoperative position along the bicycle frame to an operative position releasably communicating with the laterally outer portion of the outrigger wheel support.

2. The invention of claim 1 further characterized by:
the rear outrigger wheel support journaling inwardly adjacent the outrigger wheel, a smaller depending switching wheel having its lowermost surface at the same horizontal level as that of the outrigger wheel and having a width slightly greater than that of the rail to be traversed to aid the vehicle in negotiating a left hand switch.

3. The invention of claim 1 further characterized by:
both the rearward outrigger wheel support and forward outrigger wheel support brace being compound elements each having means for length adjustment to allow positioning of the outrigger wheel at an adjustable spaced distance laterally from the bicycle to allow use of the vehicle on railways having different rail spacings.

4. A vehicle for travel as a bicycle on a roadway and as a velocipede on two railroad trackage comprising a bicycle, having a medial frame supporting forward and rearward wheels, a medial pedal type propulsion system, seating means and steerage means, in combination wih appurtenant structures comprising:

forward guide wheel structure including similar yoke elements carried by the forward bicycle wheel axle and extending forwardly beyond the periphery of the forward bicycle wheel to cooperatively carry in their end parts a front guide wheel truck having two laterally extending guide wheel axles each journaling paired cooperating, adjustably spaced larger guide wheels and journaling smaller spaced travel wheels, having co-planar horizontal surfaces therebetween, all of said wheels positioned so that when the travel wheels are supported on the upper surface of a rail to be traversed the guide wheels will depend below the upper surface of that rail, with first means of biasing the front guide wheel truck to a downward position on a rail immediatly forwardly of the front bicycle wheel;

second means of adjustably biasing each pair of guide wheels inwardly toward the front guide wheel truck, and third means of pivoting the forward guide wheel structure to and maintaining it in inoperative position adjacent an upper part of the front bicycle wheel;

rearward guide wheel structure including similar cooperating guide wheel yokes pivotably carried on the rear bicycle wheel axle and extending beyond the periphery of the rear wheel on each side thereof to cooperatively carry in their outer end parts a rear guide wheel axle journaling two adjustably spaced larger guide wheels and rotatably supporting a smaller travel wheel therebetween with means of biasing the rear guide wheel structure to a downward position on a rail immediately rearward of the rear bicycle wheel and means of adjustably biasing the guide wheels toward each other; and outrigger wheel structure including a rearward outrigger wheel support pivotably supported for lateral vertical motion in a bracket carried by the bicycle frame immediately forwardly of the rear bicycle wheel axle, said rearward outrigger wheel support having means to maintain alternatively a horizontal operative position and a vertical inoperative position, and a forward outrigger wheel support brace movably mounted on the upper forward portion of the bicycle frame to extend rearwardly and downwardly therefrom to releasably communicate with the laterally outer portion of the outrigger wheel support when that support is in horizontal operative mode, said brace being movable to and maintainable in an inoperative position adjacent the upper portion of the bicycle frame.

* * * * *